UNITED STATES PATENT OFFICE.

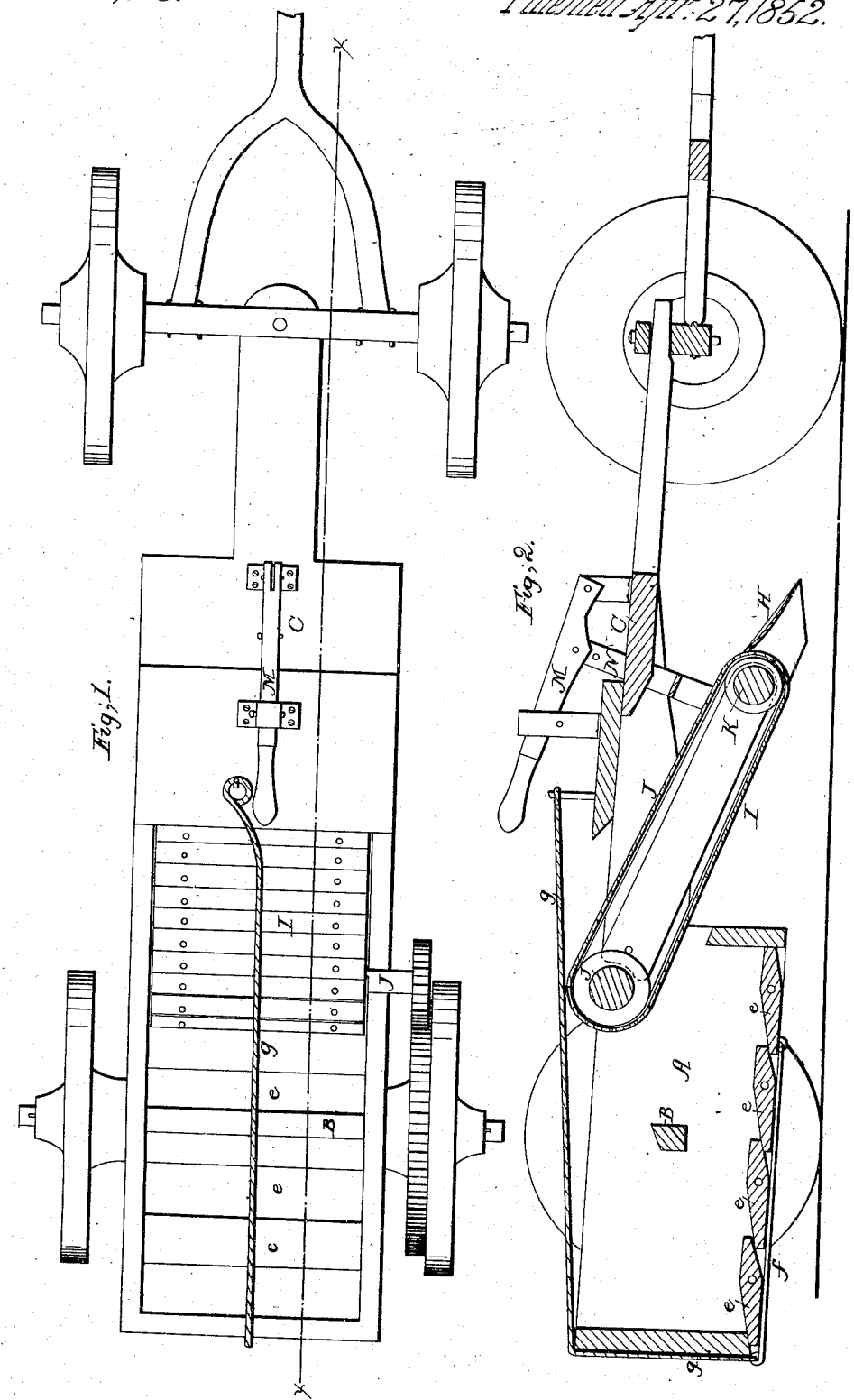

B. T. STOWELL, OF WADDAMS GROVE, ILLINOIS.

SELF LOADING AND DUMPING CAR.

Specification of Letters Patent No. 8,913, dated April 27, 1852.

*To all whom it may concern:*

Be it known that I, B. T. STOWELL, of Waddams Grove, in the county of Stephenson and State of Illinois, have invented a new and Improved Self-Loading Cart; and I do hereby declare that the following is a full and exact description thereof, reference being had to the accompanying drawings, making a part of this specification, in which—

Figure 1 is a top view and Fig. 2 a longitudinal vertical section, in the line *x. x.* of Fig. 1.

Like letters refer to corresponding parts in all the figures.

The cart body A, instead of being placed on the axle B. of the hind wheels, is placed partly or entirely below it, so that it may reach as near to the ground as possible without being liable to strike any impediment on the ground.

A platform C. extends from the top of the sides of the cart body to the forward axle. The bottom of the cart body is composed of a series of slats *e. e.* which are pivoted to the sides of the said body, and overlap each other when they are drawn into a position for making a close bottom for the cart body—as shown in Fig. 2. The pivots on which the slats *e. e.* turn upon, are located, nearest to the front edges of the slots, to enable the weight of the earth within the cart body to turn the slats and discharge itself between them as the cart is drawn forward, when the retaining bar *f*, which passes under the said slats is detached from its fastenings. The retaining rod *f.* is jointed to the foremost slat, and passes thence rearward under all the slats, and its rear end is connected to a cord or chain *g*, which passes up the rear end of the cart body and forward over the top of the same to that portion of the platform C, on which the operator is stationed, where it is made fast when it is desired to close the bottom of the cart body, and is detached from its fastening when it is desired to open the same. The cart body is filled by means of the scraper H, and the endless revolving platform I, as the cart is drawn forward. The scraper H, and the endless conveyer I, may be constructed in any well-known or usual manner. The endless platform I, passes over a drum on the shaft J, which has its bearings in the sides of the cart body near its front end, and is driven by being connected to one of the wheels on the axle B. The said endless platform conveyer also passes over a roller K, which is located between the adjustable side pieces L. L. which are framed together and their rear ends jointed to the inner sides of the cart body. To the front ends of the side pieces L. L. the scraper H. is secured, which extends from one to the other in front of the roller K. and is of a suitable shape for cutting into and gathering the turf and the earth and depositing it upon the endless platform conveyer during the forward movement of the cart.

A forked standard N. is secured to the front ends of the side pieces L. L. which rises up through the platform C, and is connected to the lever M, by means of which the scraper H, and the endless platform conveyer I, may be elevated or depressed, or retained in any desired position.

When the cart is drawn forward over the ground the cart body will be speedily filled. The scraper H, must be then elevated, and the cart drawn to the place where its load is to be discharged, when by detaching the cord or chain *g.* from its fastening, the load will be gradually discharged as the cart is drawn forward.

My self loading cart can also be used for leveling off grounds or roadways, by graduating the scraper to the proper height, and moving the cart forward with its slat, bottom left open; when the scraper will remove earth from the most elevated portions and discharge it equally upon other portions of the grounds or roadways.

The jointing of the bar *f.* to the rear edge of the foremost slat *e.* of the series composing the bottom of the cart body, causes the bar to descend vertically when its rear end is detached from its fastening, and thereby allows the whole of the slats to open simultaneously, and also enables the said slats to be closed simultaneously by exerting a vertical and longitudinal action upon the rear end of the said bar.

What I claim as my invention and desire to secure by Letters Patent, is—

The manner of opening and closing the slatted bottom of the cart body substantially as herein set forth, viz; by means of a bar *f*, which is jointed to the rear edge of the foremost slat *e*, and which when its rear end is unfastened, descends vertically and allows the whole series of slats to be opened simultaneously by the action of the weight
5 within the cart body pressing upon the same; and when the rear end of the said bar is drawn rearward and upward, simultaneously actuates the whole series of slats, and thereby closes the bottom of the cart-body.

B. T. STOWELL.

Witnesses:
Z. C. ROBBINS,
J. S. BROWN.